United States Patent
Sorrells

(10) Patent No.: US 9,458,374 B2
(45) Date of Patent: Oct. 4, 2016

(54) CYSTINE PROTEASES FOR BACTERIAL CONTROL

(71) Applicant: Schlumberger Technology Corporation, Sugar Land, TX (US)

(72) Inventor: Daniel Denton Sorrells, Sugar Land, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 13/718,877

(22) Filed: Dec. 18, 2012

(65) Prior Publication Data

US 2014/0166294 A1    Jun. 19, 2014

(51) Int. Cl.
| | | |
|---|---|---|
| E21B 43/12 | (2006.01) | |
| C09K 8/66 | (2006.01) | |
| E21B 43/267 | (2006.01) | |
| C09K 8/04 | (2006.01) | |
| C09K 8/84 | (2006.01) | |
| C02F 1/50 | (2006.01) | |

(52) U.S. Cl.
CPC . *C09K 8/66* (2013.01); *C09K 8/04* (2013.01); *C09K 8/84* (2013.01); *E21B 43/267* (2013.01); *C02F 1/50* (2013.01)

(58) Field of Classification Search
CPC .... C09K 8/528; C09K 2208/24; E21B 43/12
USPC .............................. 166/246, 308.2
See application file for complete search history.

(56) References Cited

U.S. PATENT DOCUMENTS

| | | | |
|---|---|---|---|
| 5,641,411 A | | 6/1997 | Williams et al. |
| 5,872,212 A | * | 2/1999 | Warren et al. ............... 530/350 |
| 6,913,080 B2 | * | 7/2005 | Lehman et al. ........... 166/252.3 |
| 8,188,204 B2 | * | 5/2012 | Bergeron et al. ............ 526/312 |
| 2010/0152069 A1 | | 6/2010 | Harris |
| 2010/0314057 A1 | | 12/2010 | Renirie et al. |

FOREIGN PATENT DOCUMENTS

| | | |
|---|---|---|
| EP | 2444413 | 4/2012 |
| WO | WO2012116032 | 8/2012 |

OTHER PUBLICATIONS

Sheahan, et al., "Autoprocessing of the Vibrio cholerae RTX toxin by the cysteine protease domain," The EMBO Journal, 2007, pp. 2552-2561, vol. 26.

Choudhury, et al., "Improving thermostability of papain through structure-based protein engineering," Protein Engineering, Design & Selection, 2010, pp. 457-467, vol. 23, No. 6, published online Mar. 19, 2010.

(Continued)

*Primary Examiner* — Angela M DiTrani
*Assistant Examiner* — Ashish Varma
(74) *Attorney, Agent, or Firm* — Jeffrey R. Anderson; Mike Flynn; Tim Curington

(57) ABSTRACT

A produced water bacterial pretreatment method which includes a) optionally adjusting a pH and a temperature of a produced water containing bacteria; b) adding a cysteine protease to said produced water; c) allowing said cysteine protease to inactivate said bacteria, thus producing pretreated produced water; and d) introducing said pretreated produced water into a wellbore penetrating a subterranean formation is provided.

4 Claims, 2 Drawing Sheets

(56) References Cited

OTHER PUBLICATIONS

Kocabiyik, et al., "An extracellular—Pepstatin insensitive acid protease produced by Thermoplasma volcanium," Biosource Technology, 2007, pp. 112-117, vol./Issue 98, available online Jan. 4, 2006 at www.sciencedirect.com.

Pacheco, et al., "Study of the Proteolytic Activity of the Tropical Legume Crotalaria spectabilis," Z. Naturforsch., 2012, pp. 495-509, 67c, 2012, Verlag der Zeitschrift fur Naturforschung, Tubingen, http://znaturforsch.com.

Theodorou, et al., "Proton Inventories Consitute Reliable Tools in Investigating Enzymatic Mechanisms: Application on a Novel Thermo-stable Extracellular Protease from a Halo-Alkalophilic *Bacillus* sp.," J. Biochem., 2007, pp. 293-300, vol. 142. 2007, The Japanese Biochemical Society.

Sundd, et al., "Purification and Characterization of a Highly Stable Cysteine Protease from the Latex of Ervatamia coronaria," Biosci. Biotechnol. Biochem., 1998, pp. 1947-1955, vol. 62(10).

Kundu, et al., "Purification and Characterization of a Stable Cysteine Protease Ervatamin B, with Two Disulfide Bridges, from the Latex of Ervatamia coronaria," J. Argic. Food Chem., 2000, pp. 171-179, 48. Jan. 29, 2000, American Chemical Society.

Bhowmick et al., "Purification and Characterization of a Novel Protease from the Latex of Pedilanthus tithymaloids," Protein & Peptide Letters, 2008, pp. 1009-1016, vol. 15, No. 9, 2008, Bentham Science Publishers Ltd.

Kumar et al., "Characterization of a highly stable cysteine protease of a newly isolated *Bacillus* sp. LK-11 (MTCC 5541) from Uttarakhand Himalaya," Journal of Pharmacy Research, 2011, pp. 854-858, vol. 4, No. 3.

Dubey, et al., "Procerain, a stable cysteine protease from the latex of Calotropis procera," Phytochemistry, 2003, pp. 1057-1071, vol. 62, 2003, Elsevier Science Ltd.

\* cited by examiner

CYSTINE PROTEASES FOR BACTERIAL CONTROL

CROSS-REFERENCE TO RELATED APPLICATIONS

Not applicable.

BACKGROUND

Hydraulic fracturing or "fracking" is the propagation of fractures in a rock layer by a pressurized fluid. The oil and gas industry uses hydraulic fracturing to enhance subsurface fracture systems to allow oil or natural gas to move more freely from the rock pores to production wells that bring the oil or gas to the surface. However, there are many uses for hydraulic fracturing outside of the oil and gas industry, including to stimulate groundwater wells, to precondition rock for cave in mining, to enhance waste remediation processes, to dispose of waste by injection into deep rock formations, including $CO_2$ sequestration, to measure the stress in the earth, and for heat extraction in geothermal systems.

The two main purposes of fracturing fluid or "frack fluid" in oil formations is to extend fractures in the formation and to carry proppants, such as grains of sand, into the formation, the purpose of which is to hold the fractures open without damaging the formation or production of the well. Two methods of transporting the proppant in the fluid are used—high-rate and high-viscosity. High-viscosity fracturing tends to cause large dominant fractures, while with high-rate (slickwater) fracturing causes small spread-out micro-fractures.

A variety of chemicals can be used to increase the viscosity of the frack fluid in high viscosity fracturing. However, common and inexpensive thickening agents include plant-based polysaccharides, such as cellulose, guar gum, xantham gum, and their derivatives. In fact, more than 65% of conventional fracturing fluids are made of guar gum (galactomannans) or guar gum derivatives such as hydroxypropyl guar (HPG), carboxymethyl guar (CMG) or carboxymethylhydroxypropyl guar (CMHPG). These polymers can also be cross-linked together to increase their viscosities and increase their proppant transport capabilities.

The plant based polysaccharides are linear or branched sugar polymers. Guar, for example, consists of a backbone of D-mannose residues bound to each other by a beta-1,4 linkage; molecules of in a ratio of 1:2 are also randomly attached to the backbone by an $\alpha$-1,6 linkages. Cellulose, in contrast, is a polysaccharide consisting of a linear chain of several hundred to over ten thousand $\beta(1\rightarrow4)$ linked D-glucose units.

One of the issues that can arise in using polysaccharide and other thickeners that can be biologically degraded, is premature loss of viscosity. When oilfield produced water was used "as is" to prepare fracturing fluids, our studies have shown that the viscosity of the fluids usually quickly deteriorated in much the same manner as if a viscosity breaker had been prematurely activated in the fluid. Through a number of control experiments, we identified the likely cause of the fluid failure as the degradation of polysaccharide by bacteria and/or related enzymes (e.g., polysaccharidases) present in the produced water.

This suggests that before use, water should be treated with bactericides to avoid premature breakage. However, in our experiments, bactericides used at typical, anti-microbially effective concentrations were surprisingly found to have little or no effect on retaining fluid viscosity.

Thus, there is an unfulfilled need in the art for a cost-effective treatment of oilfield produced water so that the water can be used in the preparation of otherwise conventional highly viscous fracturing and other well treatment fluids and avoid premature loss of viscosity.

SUMMARY

The disclosure generally relates to water pretreatment methods that reduce or eliminate premature enzymatic breakage of polysaccharide injection fluids. This disclosure applies cysteine proteases for such pretreatments.

In one embodiment, the disclosure described using plant enzymes as a control method to interrupt bacterium capabilities to interact and destroy polysaccharidases and other enzymes that may prematurely break frack fluids and other biological thickening agents. Possible enzymes come from a group of proteins known as cysteine endopeptidases such as bromelain, papain, calpain, and ficain, and the like.

However, other proteases, such as serine proteases and aspartyl protease may also be used, since they also have antibacterial activity. Serine proteases, in particular, may be suitable for high temperature applications. Metalloproteases also have antibacterial effect, but the metal cofactors (Zn or Co) may in some cases be less desirable for downhole uses.

Many plant proteases are already commercially available in powder form, and can be easily refined from natural fruit sources. Further, cysteine and other proteases obtained from other sources, including synthetically produced or recombinantly produced enzymes, or active domains thereof (see e.g., FIG. 2), can also be used as described herein.

The cysteine protease has the advantage of only degrading proteins, leaving most fluid additives intact. Cysteine protease may also prevent the bacteria within the water from being able to attach themselves to the polysaccharide structure.

We do not wish to be bound by theory, but propose that produced water usually has bacteria in it and by the time that the water is used (or re-used), the number of bacteria may be significant. Even if killed, the bacteria will lyse, thus spilling out the digestive enzymes, which are then free to break frack fluids. Further, the pilus covered cell wall segments may wrap around the polysaccharides in the fluid, thus providing protease access to the frack fluid polymers. Because of this, we suggest it may be more effective to employ proteases, rather than non-specific bacterial lysing agents. The protease may degrade proteins on the outside of the bacteria, preventing them from binding to and attacking polysaccharides and other biological thickeners.

As used herein, all accession numbers are to GenBank unless indicated otherwise.

Exemplary protein species are provided herein. However, enzyme nomenclature varies widely, thus any protein that catalyzes the same reaction (e.g., EC 3.4.22) can be substituted for a named protein herein. Further, while exemplary protein sequence accession numbers are provided herein, each is linked to the corresponding DNA sequence, and to related sequences. Further, related sequences can be identified easily by homology search and requisite activities confirmed as by enzyme assay, as is shown in the art.

Additional enzymes can also be searched through the database available at brenda-enzymes.info. Many similar databases are available including UNIPROTKB, PROSITE;

5 EC2PDB; ExplorEnz; PRIAM; KEGG Ligand; IUBMB Enzyme Nomenclature; IntEnz; MEDLINE; and MetaCyc, to name a few.

In various embodiments of the method include one or more of the following:

A produced water bacterial pretreatment method, comprising:
  a. optionally adjusting a pH and a temperature of a produced water containing bacteria;
  b. adding a cysteine protease to said produced water;
  c. allowing said cysteine protease to inactivate said bacteria, thus producing pretreated produced water; and
  d. using said pretreated produced water in a subterranean formation.

The method can further comprise adding a biological thickening agent, such as polysaccharides, to said pretreated produced water. The thickening agent can be added before or after injection, but it is often added before.

The cysteine protease can be any known, or future synthesized or discovered cysteine protease, or active domain thereof, including those cysteine proteases of Table 1. Additional proteases can also be used, such as serine or aspartyl proteases.

In another embodiment, there is a method of pretreating water before formation use, said method comprising:
  a. obtaining water containing bacteria;
  b. adjusting a pH and a temperature of said water to be within a pH range of one or more cysteine proteases;
  c. adding one or more cysteine proteases to said water;
  d. allowing said one or more cysteine proteases to inactivate said bacteria, thus producing pretreated water; and
  e. using said pretreated water in a subterranean formation.

In yet another embodiment, there is a method of pretreating water before fracturing use, said method comprising:
  a. obtaining a water containing bacteria;
  b. optionally adjusting a pH and a temperature of said water to be within a pH range of one or more cysteine proteases;
  c. adding one or more cysteine proteases to said water;
  d. allowing said one or more cysteine protease to inactivate said bacteria, thus producing pretreated water; and
  e. adding a biological thickener to said pretreated water to make a fracturing fluid; and
  f. injecting said fracturing fluid into a subterranean formation under a pressure sufficient to fracture said formation.

Proppant can be added to said fracturing fluid, as can other conventional additives, such as acids, bases, buffers, breakers, delayed breakers, such as encapsulated breakers or sol gel stabilized breakers, clay stabilizers, corrosion inhibitors, crosslinkers, delayed crosslinkers, friction reducers, scale inhibitors, surfactants, and the like.

By "biological thickener" what is meant is a thickening agent that can be biologically degraded, including e.g., polysaccharides, proteins, and the like. Many synthetic polymers e.g., poly(lactic acid), can also be biologically degraded, depending on the monomer content and type of crosslinkers. If such can be degraded by bacteria, they are to be included within the scope of the term.

A "produced water" is defined herein as water that is produced during oil and gas production, and is thus to be re-used for further production needs.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the embodiments.

The following abbreviations are used herein:

| ABBREVIATION | TERM |
| --- | --- |
| $T_{op}$ | Temperature optimum |
| $pH_{op}$ | pH optimum |
| CP | Cysteine protease |
| Cfu | Colony forming units |
| RT | Room temperature |

BRIEF DESCRIPTION OF THE DRAWINGS

A more complete understanding of the method and composition of the present application may be obtained by reference to the following Detailed Description when taken in conjunction with the accompanying Drawings wherein.

DETAILED DESCRIPTION

Figure 1:
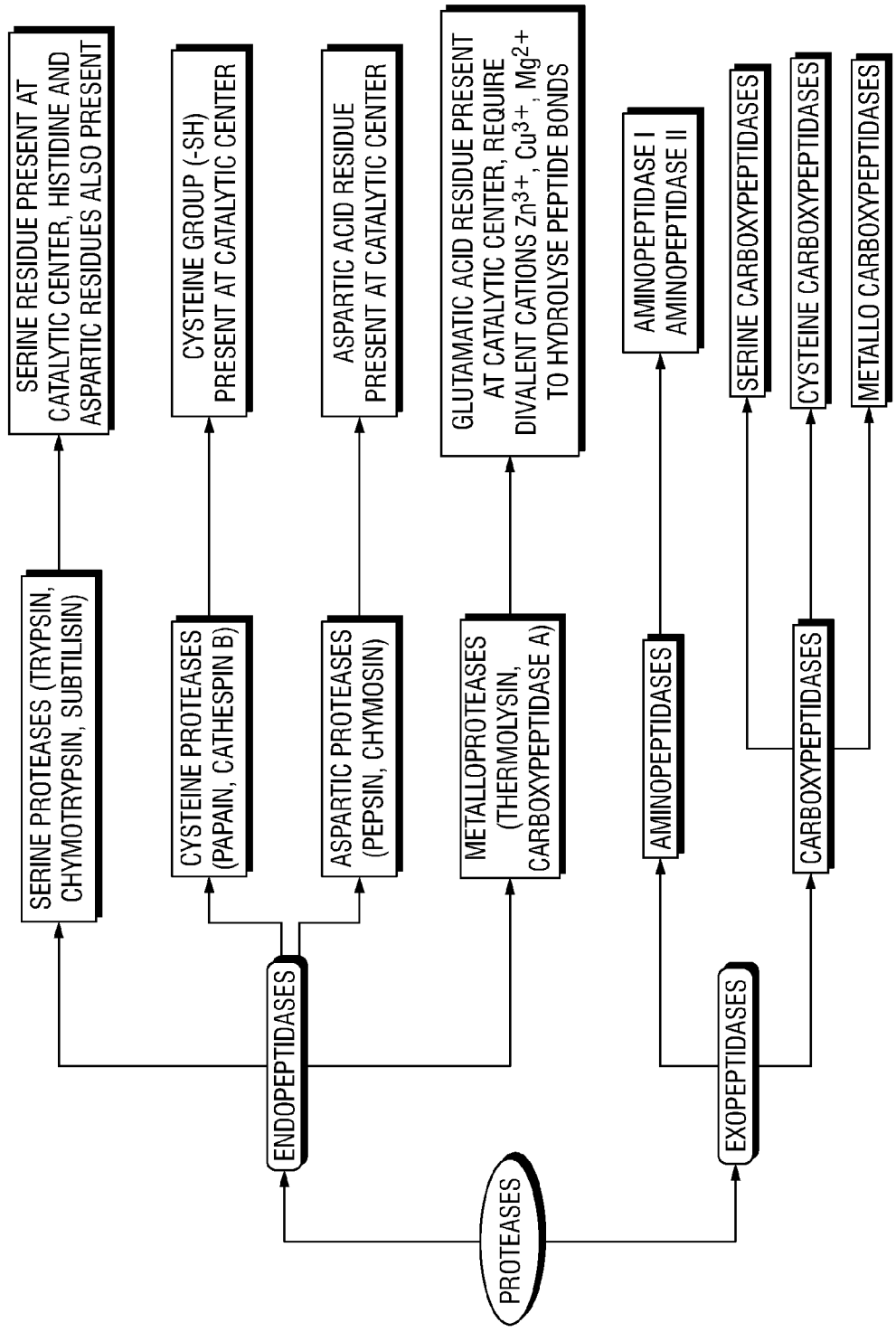
FIG. 1 shows the classification of proteases.
Figure 2:
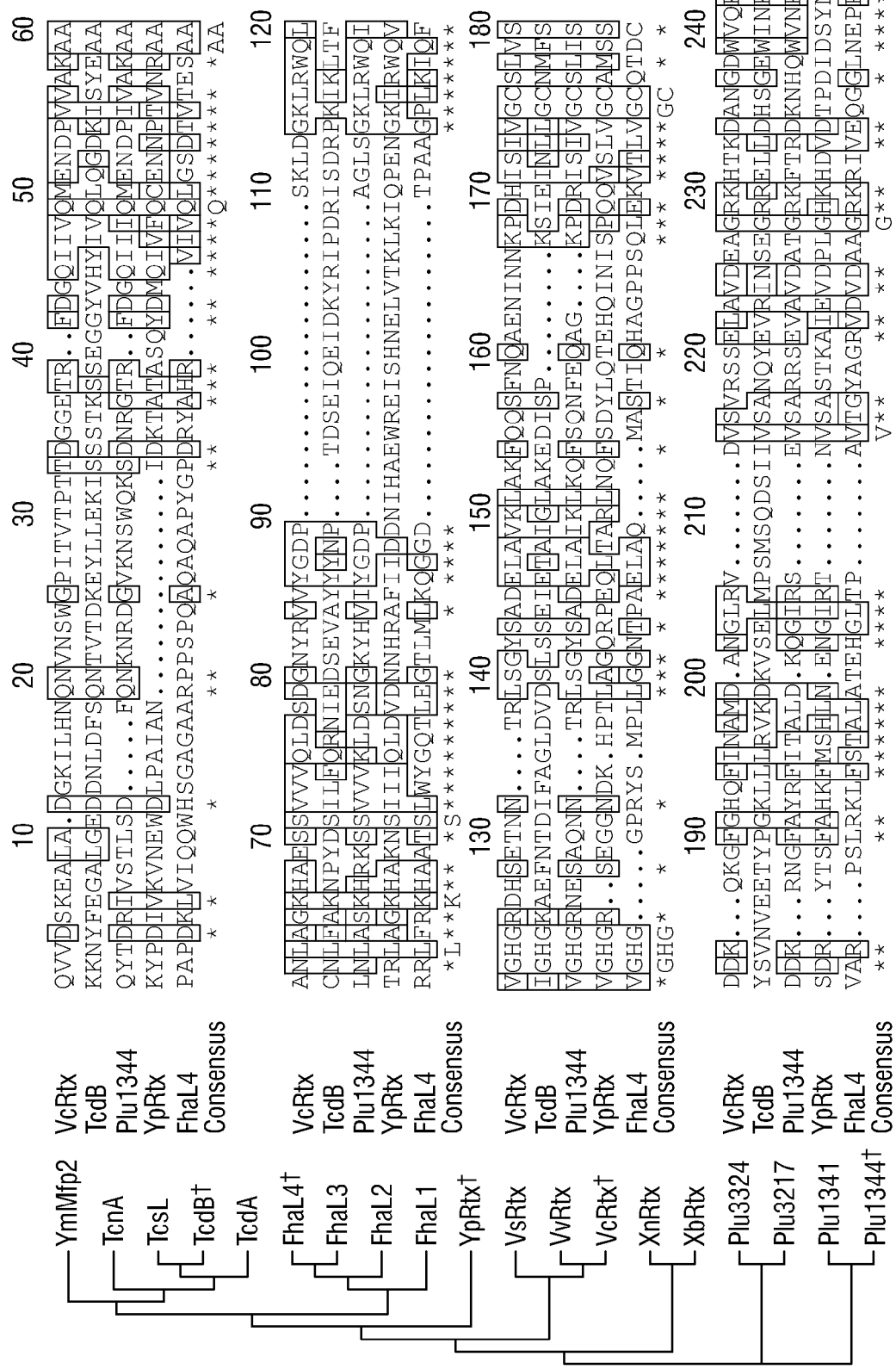
FIG. 2 shows the alignment of putative cysteine protease domains. From Kerri-Lynn Sheahan, Autoprocessing of the *Vibrio cholerae* RTX toxin by the cysteine protease domain, EMBO journal 2007 Vol: 26(10):2552-2561.

The purpose of this disclosure is to provide methods of controlling bacteria or enzymes in water used for fracturing fluid, specifically in produced water to be reused for future projects. Normally, bacterial control is through a lytic process, leading to destruction of the cell wall. This kills the bacteria, but releases digestive enzymes and other materials that may be damaging to the fracturing fluid by damaging the polysaccharides or by changing the pH or other factors that affect the fluid quality. When large amounts of bacteria are present this can make the fluid fail.

Many cysteine proteases are considered to have antibacterial properties. This is not due to a typical lytic process that destroys the cell wall structure. Instead these enzymes destroy proteins in the extracellular matrix that allow the bacteria to attach to polysaccharides and draw them into the cells for digestion, slowing the ability to come in contact with these molecules and starving the cells, leaving the polysaccharides relatively intact.

Known sources of cysteine proteases include bromelain from pineapple, papain from papaya, ficain from figs, and actinidain found in kiwi and other fruits. These are all commercially available as meat tenderizers, dietary aids, and other products, with known ability to destroy the extracellular proteins around cells.

There are two major families of cysteine proteases. The "caspases" are cytosolic, asparate-specific and involved in apoptosis, whereas "cathepsins" are mainly lysosomal, active under acidic conditions and involved in protein degradation. Legumain and separase are two newer proteases with the specificity for Asn residue and Cohesin, respectively. Exemplary proteases are listed in Table 1.

TABLE 1

Exemplary cysteine proteases

Caspases

Caspase (Pan-specific)
Caspase-1 to Caspace 13 (including all caspaces between 1 and 13)
Cathepsins Cathepsins 1, 3 6, 7
Cathepsin A, B, C, D, E, F, H, K, L, O, S, V, Z, P,
Plant Cysteine Proteases Bromelain e.g. BAA21929
Papain e.g., AAA72774, ADO14465, CAA08860
Actinidain e.g., P00785
Phytocalpains e.g., AAQ55288, AAN10107, BAI44850, EGZ10846
Ficain
Other Cysteine Proteases Ataxin UIM Domains
Otubain-1
Otubain-2
Ataxin-3
PGPEP-1
ATG4A
TEV Protease (salt stable)
ATG4B/Apg4b
TIN-Ag
BLMH/Bleomycin Hydrolase
UCH-L1
UCH-L3
FAM105B/OTULIN
Legumain/Asparaginyl Endopeptidase
USP9x
Calpain
MIR1-cp
Stable Cysteine Proteases Cysteine proteases from *Ervatamia coronaria* with e.g., $pH_{op}$ of 7.5-8.0 and $T_{op}$ of 50° C., but pH range (2-12) and wide temperature stability. See Kundu 2000 and Sundd 1998.
Various proteases from *Crotalaria spectabilis* have an optimal pH value in the alkaline range and activity from 30-60° C. and are thermostable (24 hr at 60° C.). See Pacheco 2012.
Cysteine protease from *Pedilanthus tithymaloids* with $pH_{op}$ 8.0-9.5 and $T_{op}$ 65-70° C. The enzyme was relatively stable towards pH change, temperature, denaturants and organic solvents. See Bhowmick 2008.
Cysteine protease from *Bacillus* sp. LK-11 (MTCC 5541) is solvent stable at 60° C. at pH 8.5. See Kumar 2011.
Procerain. Dubey 2003.
A thermostable acid protease from *Thermoplasma volcanium* with $pH_{op}$ 3.0 and $T_{op}$60° C. Broad pH range (pH 3.0-8.0), Temperature range 50-70° C. Kocabiyik 2007.

Many proteases are already on the market and are used as an active ingredient in many powdered meat tenderizers, detergents, baking, brewing, leather processing, pharmaceuticals, cosmetics, and other commercial products. Such enzymes are also easily obtainable, for example, from plant materials. Impure plant samples can be obtained through the saps of the fruit stems or through the juice, though these may contain many components that may not work well with a fracturing fluid, and thus the protease may need some amount of purification, e.g., by solvation, salt precipitation, cation exchange chromatography, size exclusion, affinity chromatography, and the like.

It will be appreciated the choice of the ideal protease(s) will depend in large part on the field water pH, temperature and contaminants such as heavy metals, hydrocarbons, and the like. Thus, high temperature proteases may be applicable when reused water temperatures are high, and several naturally thermostable enzymes are already known. Further, one can mutate an already high temperature enzyme to further improve temperature stability. This can be done by culture under increasing selective pressure, or by site specific mutagenesis, since the crystal structures are known in many cases, and work of this nature has already been undertaken. See e.g., Choudhury (2010).

Water pH can also vary, on occasion being less than pH 4 or over pH 8. Thus, in such instances one would select an acid stable or alkaline stable enzyme, and many are available in the literature.

Solvent stable proteases are also known. For example, procerain, a stable cysteine protease from the latex of *Calotropis procera* is stable at very high concentrations of chemical denaturants and organic solvents. Dubey 2003. Another highly stable cysteine protease was purified to homogeneity from the latex of *Ervatamia coronaria*, had pH and temperature optima of 7.5-8.0 and 50° C. respectively. The striking property of this enzyme was its stability over a wide pH range (2-12) and other extreme conditions of temperature, denaturants, and organic solvents. Sunnd (1998).

Salt stable enzymes are also known, e.g., from halobacteria. As another example, the TEV protease, a commercially available enzyme from tobacco etch virus, has 50% maximal activity in 0.5 M NaCl!

In many instances, a blend of proteases covering a larger range of suitable conditions may be used, thus simplifying site deployment.

The enzyme can be added directly to a produced water source (or a general water source to be used) if the pH is in the correct range for the enzyme, however, as noted many of such enzymes have a modest pH range. For example papain is only active from pH 4.2 to 8.2. Thus, buffers or pH changers may be needed in some environments with a pH outside the range. Similarly, it may be desirable to cool produced water somewhat before use, unless temperature stable enzymes are used.

The level of added enzyme will vary based on bacterial load, Km and Vmax or the chosen proteins, but a suitable range might be 10-100 µg/ml, or 100 µg-500 mg/l. More may be needed if the water is particularly contaminated with denaturants, but the user will try to minimize the amount, and thus the cost.

Once pH corrected, the enzyme is added, enough time must elapse for the enzymes to destroy the extracellular matrix. This can be assessed with a simple culture count, or by more sophisticated methods, such as assessing viscocity and premature breakage under frack-like conditions.

The enzyme should generally remain stable until a denaturing event occurs (spike in pH, high temperature, etc) and/or bacteria are sufficiently treated.

Further, many protein inhibitors of cysteine proteases are known, and can be used if needed to terminate the reactions.

Papain, as one example, is usually produced as a crude, dried material by collecting the latex from the fruit of the papaya tree. The latex is collected after scoring the neck of the fruit, where it may either dry on the fruit or drip into a container. This latex is then further dried. A purification step may be necessary to remove contaminating substances. This purification consists of the solubilization and extraction of the active papain enzyme, or affinity chromatography, and the like, and the final papain may be supplied as powder or as liquid.

As stated above, such proteases are believed to work by destroying the extra cellular matrix a bacteria will use to attach itself to fluid additives such as polysaccharides, thus allowing the bacteria to use the downhole polysaccharides as a food source. Cysteine, serine and aspartyl proteases cleave the proteins internally, which classifies them as endopeptidases (see e.g., FIG. 1). Other peptidases would cleave the protein from the outer end and remove each amino acid off of the protein structure (exopeptidase). However, the enodpeptidases can provide a quicker means of degradation.

The other useful component of cysteine protease is the zymogen activation mechanism. Bromelain, for example, can be activated by the presence of $H_2S$, meaning the presence of sulphate reducing bacteria may lead directly to the activation of the enzyme. Thus, the need to activate the zymogen is eliminated.

Protease control of bacteria will have similar draw backs to other enzymes used in fracturing fluids. As complex proteins, they can be denatured by a change in pH or change in temperature. However, such fluids can be corrected down to around pH 7 or other suitable pH, and waters can be cooled to approach surface ambient temperatures. Thus, such enzymes should be sufficiently stable to be functional. Further, as noted above, acid, alkaline, salt, solvent and thermostable variants are already well known and available for use. Thus, a broad range of water conditions can be remediated using the methods described herein.

Sample 1

One gram of a commercially available Bromelain pill was used in the experiment. The label noted 500 mg of bromelain in a pill roughly 1.4 g. A produced water sample of pH 7.5 and at room temperature (RT) was treated by adding ground powder from the pill to 1 liter of fluid and gentle mixing until the powder dissolved. At 30 minutes the bacteria level was reduced by close to half, as assessed using a Mycometer Bactiquant analysis. Bactiquant values are linearly related to cfu.

|  | Time | Reading | Bactiquant Value |
| --- | --- | --- | --- |
| Pretreatment | 0 | 2836 | 1401151 |
| Bromelain treatment | 30 min | 2013 | 784242 |

Viscosity tests will be run in the next year, wherein a variety of cysteine proteases will be tested for their ability to inhibit premature breakage of 1% guar gum and/or carboxymethyl cellulose (CMC) thickened frack fluids made with tap water innoculated with equivalent amounts of bacteria, and containing various percent NaCl, various ions commonly included in frack fluids, and at differing pHs. Although, pure cultures of bacteria can be assessed, it may also be beneficial to test bacterial samples obtained from produced water, as being more indicative of the actual formation ecology. Samples will be incubated at various temperatures for up to 48 hrs, and small samples withdrawn over time for viscosity measurements. Steady-shear viscosities of gelled fracturing fluids can be measured e.g., using a Couette viscometer, such as the FANN® Model 35. A dynamic-oscillatory rheometer can generate signals to separately identify the elastic property of the frack fluid, but this is probably not essential for the initial testing runs.

It is expected that the cystein proteases will inhibit premature breakage, and data on the suitability of various enzymes for various conditions will be obtained.

Although various embodiments of the method and apparatus of the present application have been illustrated in the accompanying Drawings and described in the foregoing Detailed Description, it will be understood that the application is not limited to the embodiments disclosed, but is capable of numerous rearrangements, modifications and substitutions without departing from the spirit of the application as set forth herein.

It should also be noted that in the development of any such actual embodiment, numerous implementation-specific decisions must be made to achieve the developer's specific goals, such as compliance with environmental, technical, and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the compositions and methods used/disclosed herein can also comprise some components other than those cited.

In the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

The following references are incorporated by reference in their entireties for all purposes:

Choudhury D, et al., Improving thermostability of papain through structure-based protein engineering, Protein Eng Des Sel. 2010 June; 23(6):457-67.

Kocabiyik S & Ozel H, An extracellular-pepstatin insensitive acid protease produced by *Thermoplasma volcanium*, Bioresour Technol. 2007 January; 98(1):112-7. Epub 2006 Jan. 4.

Pacheco Jda S & da Silva-López R E, Study of the proteolytic activity of the tropical legume *Crotalaria spectabilis*, Z Naturforsch C. 2012 September-October; 67(9-10):495-509.

Theodorou L G, et al., Proton inventories constitute reliable tools in investigating enzymatic mechanisms: application on a novel thermo-stable extracellular protease from a halo-alkalophilic *Bacillus* sp. J. Biochem. 2007 August; 142(2):293-300.

Sundd M, et al., Purification and characterization of a highly stable cysteine protease from the latex of *Ervatamia coronaria*, Biosci Biotechnol Biochem. 1998 October; 62(10):1947-55.

Kundu S, Purification and characterization of a stable cysteine protease ervatamin B, with two disulfide bridges, from the latex of *Ervatamia coronaria* J Agric Food Chem. 2000 February; 48(2):171-9.

Bhowmick R, et al. Purification and characterization of a novel protease from the latex of *Pedilanthus tithymaloids*, Protein Pept Lett. 2008; 15(9):1009-16.

Kumar, L., et al., Characterization of a highly stable cysteine protease of a newly isolated *Bacillus* sp. LK-11

(MTCC 5541) from Uttarakhand Himalaya, J. of Pharmacy Research; March 2011, Vol. 4 Issue 3, p 854.

Dubey V K & Jagannadham M V, Procerain, a stable cysteine protease from the latex of *Calotropis procera*, Phytochemistry. 2003 April; 62(7):1057-71.

I claim:

1. A method of treating an oilfield fluid having an initial viscosity, comprising:
    a) adjusting a pH and a temperature of the oilfield fluid containing bacteria;
    b) adding a cysteine protease to said oilfield fluid;
    c) allowing said cysteine protease to inactivate said bacteria, thus producing pretreated oilfield fluid; and
    d) introducing said pretreated oilfield fluid into a wellbore penetrating a subterranean formation.

2. The method of claim 1, further comprising adding a biological thickening agent to said oilfield fluid.

3. The method of claim 1, further comprising adding a biological thickening agent to said oilfield fluid before step d).

4. The method of claim 1, wherein said cysteine protease is selected from the group consisting of caspases, cathepsins, plant cysteine proteases, stable cysteine proteases, Ataxin UIM Domains, otubain-1, otubain-2, ataxin-3, PGPEP-1, ATG4A, TEV Protease, ATG4B/Apg4b, TIN—Ag, BLMG/bleomycin hydrolase, and UCH-L1.

* * * * *